US012592426B2

(12) United States Patent　　　　(10) Patent No.:　US 12,592,426 B2

Lee　　　　　　　　　　　　　　　　(45) Date of Patent:　Mar. 31, 2026

(54) COLD WEATHER SMART BATTERY HEATING AND CHARGING STRATEGY UTILIZING MULTI-STAGE BATTERY HEATING CONTROL

(71) Applicants:Hyundai Motor Company, Seoul (KR); Kia Corporation, Seoul (KR)

(72) Inventor: Kevin Lee, Los Angeles, CA (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 661 days.

(21) Appl. No.: 18/076,947

(22) Filed: Dec. 7, 2022

(65) Prior Publication Data

US 2024/0194965 A1　Jun. 13, 2024

(51) Int. Cl.
H01M 10/615　(2014.01)
H01M 10/42　(2006.01)
H01M 10/625　(2014.01)

(52) U.S. Cl.
CPC ..... H01M 10/615 (2015.04); H01M 10/4257 (2013.01); H01M 10/625 (2015.04)

(58) Field of Classification Search
CPC ........... H01M 10/615; H01M 10/4257; H01M 10/625; H01M 2220/20; B60L 58/27; B60L 3/12; B60L 2240/662; B60Y 2200/91; B60Y 2400/11; Y02T 10/70
USPC ......................................................... 320/109
See application file for complete search history.

(56) References Cited

U.S. PATENT DOCUMENTS

| 7,154,068 B2 * | 12/2006 | Zhu | .................... H01M 10/6571 |
| | | | 219/202 |
| 8,188,705 B2 | 5/2012 | Wakayama | |
| 9,337,680 B2 | 5/2016 | Gibeau et al. | |
| 10,406,933 B2 | 9/2019 | Nomura | |

(Continued)

FOREIGN PATENT DOCUMENTS

| EP | 3103158 B1 * | 5/2020 | .............. B60L 50/64 |
| EP | 4023489 A1 * | 7/2022 | .......... H01M 10/663 |

OTHER PUBLICATIONS

Song et al., (Song), Experimental Study on the Effects of Pre-Heating a Battery in a Low-Temperature Environment, pp. 1198-1201 (Year: 2012).*

(Continued)

*Primary Examiner* — M Baye Diao

(74) *Attorney, Agent, or Firm* — Fox Rothschild LLP

(57)　　　ABSTRACT

Systems and methods for preheating a battery heater of an electric vehicle (EV) are provided. The method may comprise determining an estimated vehicle start time for the EV, determining whether an ambient temperature of a battery is less than –5° C., when the ambient temperature of the battery is less than –5° C., performing a level 1 heating function, when the ambient temperature of the battery is not less than –5° C., determining whether the ambient temperature of the battery is between –5° C. and 5° C., when the ambient temperature of the battery is between –5° C. and 5° C., performing a level 2 heating function, when the ambient temperature of the battery is above –5° C. and not between –5° C. and 5° C., then, determining whether the ambient temperature of the battery is between 5° C. and 10° C., and when the ambient temperature of the battery is between 5° C. and 10° C., performing a level 3 heating function.

20 Claims, 7 Drawing Sheets

(56) References Cited

U.S. PATENT DOCUMENTS

| | | | | |
|---|---|---|---|---|
| 10,770,766 | B2 * | 9/2020 | Ohgaki | H01M 10/625 |
| 10,780,795 | B2 * | 9/2020 | Zuo | H01M 10/625 |
| 10,886,583 | B2 * | 1/2021 | Ciaccio | H01M 50/20 |
| 10,913,361 | B2 * | 2/2021 | Ko | H01M 10/486 |
| 12,325,329 | B2 * | 6/2025 | Wu | B60L 1/16 |
| 12,391,146 | B2 * | 8/2025 | Zhao | B60L 1/02 |
| 12,408,240 | B2 * | 9/2025 | Spaulding | H01M 10/615 |
| 2006/0284601 | A1 * | 12/2006 | Salasoo | B60L 58/27 |
| | | | | 320/150 |
| 2012/0261397 | A1 * | 10/2012 | Schwarz | B60L 58/13 |
| | | | | 219/202 |
| 2013/0288089 | A1 * | 10/2013 | Kinoshita | H01M 10/486 |
| | | | | 429/62 |
| 2015/0115886 | A1 * | 4/2015 | Loftus | B60L 53/00 |
| | | | | 320/109 |
| 2016/0144731 | A1 * | 5/2016 | Park | B60L 53/00 |
| | | | | 320/109 |
| 2022/0314837 | A1 * | 10/2022 | Gupta | B60L 58/26 |

OTHER PUBLICATIONS

Zhang et al., "An optimal thermal management system heating control strategy for electric vehicles under low-temperature fast charging conditions", Applied Thermal Engineering vol. 207, May 5, 2022, 118123 (Year: 2022).*

* cited by examiner

200

300

400

500

COLD WEATHER SMART BATTERY HEATING AND CHARGING STRATEGY UTILIZING MULTI-STAGE BATTERY HEATING CONTROL

BACKGROUND

Technical Field

Embodiments of the present disclosure relate to systems and methods for preheating a battery heater of an electric vehicle (EV), enabling the battery heater to preheat a battery by estimating when a user will start the vehicle through a multi-level heating strategy.

Background

Electric vehicles (EVs) generally comprise one or more fuel cells (e.g., batteries) configured to power one or more components of the EV. Fuel cell performance often fluctuates based on ambient temperatures, with cold ambient temperatures often resulting in poor fuel cell performance.

In cold weather, with cold ambient temperatures, EVs generally utilize one or more battery heaters configured to heat up (raise the temperature of) the battery or batteries in order to prevent poor battery power performance due to cold battery temperature. However, battery heaters typically turn off after achieving a target temperature. Additionally, battery heaters typically turn on once during a charge session, of the battery or batteries, and, once the charge session completes, the battery heater can no longer use the charger energy to heat the battery or batteries and, instead, uses the EV's own state of charge (SOC) to heat up the battery or batteries. This causes the battery temperature to once again drop down before a user drives the EV.

If a charge session finishes, an onboard charger's high voltage system will generally disconnect, not allowing the battery heater to utilize energy coming from the charger in order to heat up the battery, and instead utilize the EV's battery internal energy to heat up, causing a low SOC when a user drives the EV.

For at least these reasons, systems and methods for preheating a battery heater, enabling the battery heater to preheat the battery by estimating when a user will start the vehicle through a multi-level heating strategy is thus needed

SUMMARY

According to an object of the present disclosure, a method for preheating a battery heater of an electric vehicle (EV) is provided. The method may comprise determining an estimated vehicle start time for an EV, determining whether an ambient temperature of a battery of the EV is less than −5° C., when the ambient temperature of the battery is less than −5° C., performing a level 1 heating function to heat the battery, when the ambient temperature of the battery is not less than −5° C., determining whether the ambient temperature of the battery is between −5° C. and 5° C., when the ambient temperature of the battery is between −5° C. and 5° C., performing a level 2 heating function to heat the battery, when the ambient temperature of the battery is not less than −5° C. and not between −5° C. and 5° C., then, determining whether the ambient temperature of the battery is between 5° C. and 10° C., and when the ambient temperature of the battery is between 5° C. and 10° C., performing a level 3 heating function to heat the battery.

According to an exemplary embodiment of the present disclosure, the determining the estimated vehicle start time for the EV may comprise determining whether a vehicle charger was plugged in to the EV for at least a minimum threshold time duration prior to the EV being turned on, determining whether the EV was parked for a minimum threshold time duration prior to being turned on, determining whether a user drove the EV for a minimum threshold driving distance on a first driving event over a set timeframe, and, when the vehicle charger was plugged in to the EV for the at least a minimum threshold time duration prior to the EV being turned on, the EV was parked for the minimum threshold time duration prior to being turned on, and the user drove the EV for the minimum threshold driving distance on the first driving event over the set timeframe, determining the estimated vehicle timeframe as a time at which the vehicle was first turned on over the set timeframe.

According to an exemplary embodiment of the present disclosure, the minimum threshold time duration that the vehicle charger was plugged in to the EV prior to the EV being turned on may be one hour.

According to an exemplary embodiment of the present disclosure, the minimum threshold time duration that the EV was parked prior to the EV being turned on may be eight hours.

According to an exemplary embodiment of the present disclosure, the minimum threshold driving distance may be five miles, and the set timeframe may be twenty-four hours.

According to an exemplary embodiment of the present disclosure, the determining the estimated vehicle start time for the EV may comprise updating the estimated vehicle start time.

According to an exemplary embodiment of the present disclosure, the updating the estimated vehicle start time may comprise, when a new estimated vehicle start time is earlier than then the estimated vehicle start time, updating the estimated vehicle start time as the new estimated vehicle start time, and, when the new estimated vehicle start time is later than the estimated vehicle start time for a predetermined number of times, updating the estimated vehicle start time as the new estimated vehicle start time.

According to an exemplary embodiment of the present disclosure, the predetermined number of times may be two.

According to an exemplary embodiment of the present disclosure, the performing the level 1 heating function may comprise determining whether the ambient temperature of the battery is greater than −5° C., and, when the ambient temperature of the battery is greater than −5° C., turning off the level 1 heating function.

According to an exemplary embodiment of the present disclosure, the performing the level 1 heating function may comprise calculating a battery required charge power, and calculating a battery-heater-on time for a battery heater during the level 1 function.

According to an exemplary embodiment of the present disclosure, the performing the level 1 heating function may comprise, when the battery required charge power is less than an AC/DC charge power, utilizing the battery required charge power to heat the battery, when the battery required charge power is greater than or equal to the AC/DC charge power, utilizing the AC/DC charge power to heat the battery, and, when the battery heater is turned on, utilizing, to heat the battery, the battery required charge power or the AC/DC charge power; and battery heater power.

According to an exemplary embodiment of the present disclosure, the performing the level 1 heating function may comprise, when the ambient temperature of the battery is less than −5° C., turning on the battery heater.

According to an exemplary embodiment of the present disclosure, the performing the level 2 heating function may comprise determining whether the ambient temperature of the battery is greater than 5° C., and, when the ambient temperature of the battery is greater than 5° C., turning off the level 2 heating function.

According to an exemplary embodiment of the present disclosure, the performing the level 2 heating function may comprise calculating a battery required charge power, and calculating a battery-heater-on time for a battery heater during the level 2 function.

According to an exemplary embodiment of the present disclosure, the performing the level 2 heating function may comprise, when the battery required charge power is less than an AC/DC charge power, utilizing the battery required charge power to heat the battery, when the battery required charge power is greater than or equal to the AC/DC charge power, utilizing the AC/DC charge power to heat the battery, and, when the battery heater is turned on, utilizing, to heat the battery, the battery required charge power or the AC/DC charge power, and battery heater power.

According to an exemplary embodiment of the present disclosure, the performing the level 2 heating function may comprise, when the ambient temperature of the battery is less than 5° C., turning on the battery heater.

According to an exemplary embodiment of the present disclosure, the performing the level 3 heating function may comprise determining whether the ambient temperature of the battery is greater than 10° C., and, when the ambient temperature of the battery is greater than 10° C., turning off the level 3 heating function.

According to an exemplary embodiment of the present disclosure, the performing the level 3 heating function may comprise calculating a battery required charge power, and calculating a battery-heater-on time for a battery heater during the level 3 function.

According to an exemplary embodiment of the present disclosure, the performing the level 3 heating function may comprise, when the battery required charge power is less than an AC/DC charge power, utilizing the battery required charge power to heat the battery, when the battery required charge power is greater than or equal to the AC/DC charge power, utilizing the AC/DC charge power to heat the battery, and, when the battery heater is turned on, utilizing, to heat the battery, the battery required charge power or the AC/DC charge power, and battery heater power.

According to an exemplary embodiment of the present disclosure, the performing the level 3 heating function may comprise, when the ambient temperature of the battery is less than 10° C., turning on the battery heater.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
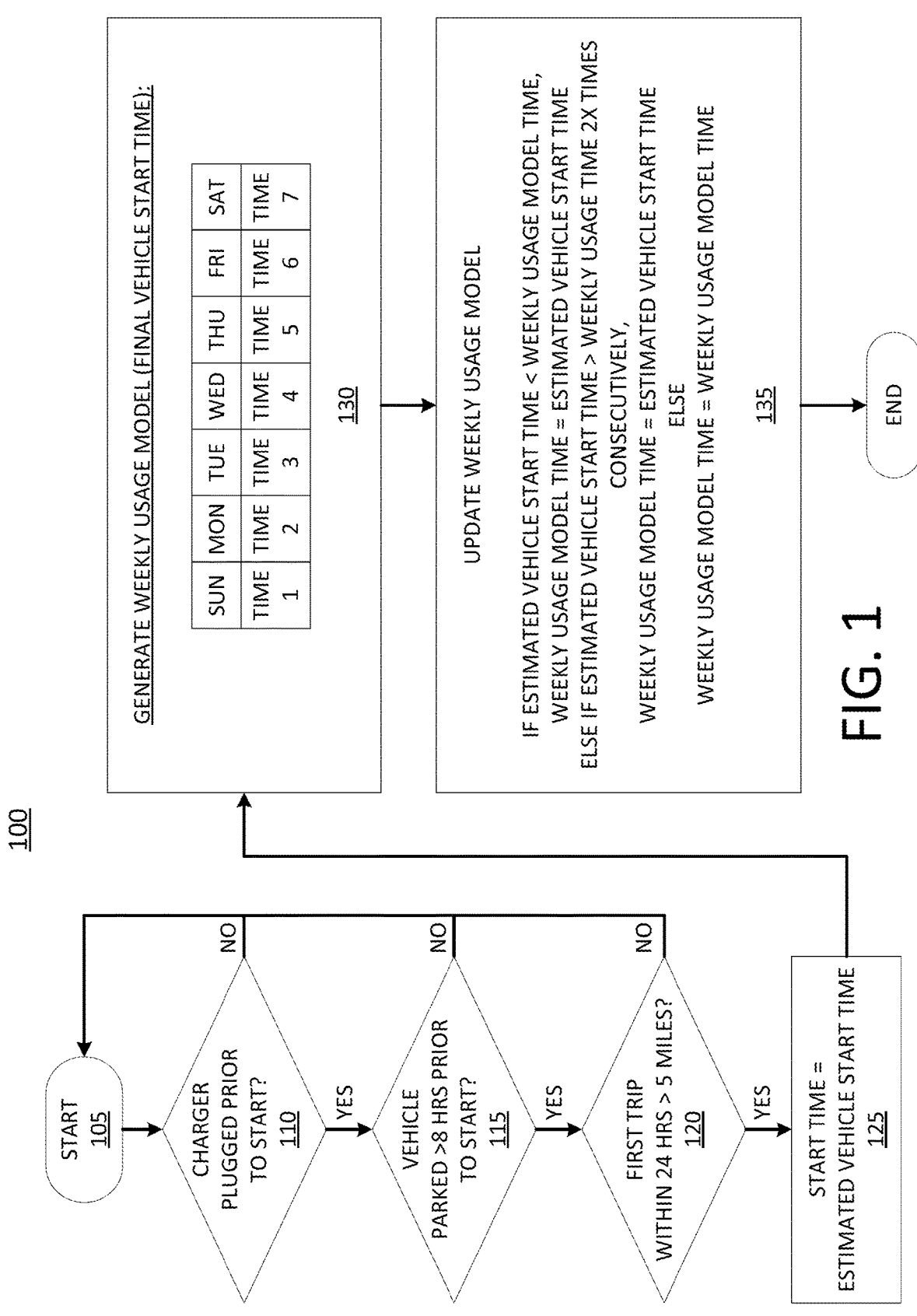
FIG. 1 illustrates a method of determining an estimated vehicle start time and estimated vehicle usage, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Systems and methods are provided, enabling a battery heater to preheat a battery by estimating when a user will start a vehicle (e.g., an electric vehicle (EV) through a multi-level heating strategy. thereby optimizing charging energy and maximizing battery temperature prior to a user driving the vehicle.

Referring now to FIG. 1, a method 100 of determining an estimated vehicle start time and estimated vehicle usage is illustratively depicted, in accordance with an exemplary embodiment of the present disclosure.

According to an exemplary embodiment, a default usage model for a vehicle is a day-by-day usage model.

According to an exemplary embodiment, the method begins, at 105, and, at 110, it is determined whether a vehicle charger was plugged in to the vehicle, charging the vehicle, for at least a minimum threshold time duration prior to the vehicle being turned on (started). According to an exemplary embodiment, at 110, the minimum threshold time duration that the vehicle charger was plugged in to the vehicle, charging the vehicle, prior to the vehicle being turned on may be one hour. It is noted, however, that other minimum threshold time durations may be incorporated, while maintaining the spirit and functionality of the present disclosure.

If the vehicle charger was not plugged in to the vehicle, charging the vehicle, prior to the vehicle being turned on, for at least the minimum threshold time duration, then the method restarts, at 105.

If the vehicle charger was plugged in to the vehicle, charging the vehicle, prior to the vehicle being turned on and/or for at least the minimum threshold time duration, then, at 115, it is determined whether the vehicle was parked for a minimum threshold time duration prior to being turned on. According to an exemplary embodiment, the minimum threshold time duration for the car to be parked before turning the car on may be eight hours. It is noted, however, that other time durations may be incorporated while maintaining the spirit and functionality of the present disclosure.

If the vehicle was not parked for the minimum threshold time duration prior to being turned on, the method restarts, at 105.

If the vehicle was parked for the minimum threshold time duration prior to being turned on, then, at 120, it is determined whether a user drove the vehicle for a minimum threshold driving distance on a first driving event over a set timeframe. According to an exemplary embodiment, the minimum threshold driving distance may be five miles. It is noted, however, that other minimum threshold driving distances may be incorporated, while maintaining the spirit and functionality of the present disclosure. According to an exemplary embodiment of the present disclosure, the set timeframe may be twenty-four hours. It is noted, however, that other set timeframe durations may be incorporated, while maintaining the spirit and functionality of the present disclosure.

If the user did not drive the vehicle for the minimum threshold driving distance on the first driving event over the set timeframe, the method restarts, at 105.

If the user drove the vehicle for the minimum threshold driving distance on the first driving event over the set timeframe, then, at 125, a time at which the vehicle was first turned on (a first start time) over the set timeframe is determined to be an estimated vehicle start time.

At 130, an estimated weekly usage model may be generated. The weekly usage model may incorporate a final vehicle start time for each day of the week. For example, after one week, Sunday (SUN), Monday (MON), Tuesday (TUE), Wednesday (WED), Thursday (THU), Friday (FRI), and Saturday (SAT) may each have a calculated/generated estimated vehicle start time (e.g., TIME 1, TIME 2, TIME 3, TIME 4, TIME 5, TIME 6, and TIME 7, respectively).

At 135, the weekly usage model may be updated with subsequent information.

According to an exemplary embodiment, for each day, if a new estimated vehicle start time is earlier than then the predicted vehicle start time for that day in the weekly usage model, the weekly usage model is updated such that the predicted vehicle start time for that day is updated to be equal to the new estimated vehicle start time.

According to an exemplary embodiment, for each day, if the new estimated vehicle start time is later than the predicted vehicle start time for that day in the weekly usage model for a predetermined number of times, the weekly usage model is updated such that the predicted vehicle start time for that day is updated to be equal to the new estimated vehicle start time. According to an exemplary embodiment, the predetermined number of times is two. It is noted, however, that other quantities for the predetermined number of times may be incorporated, while maintaining the spirit and functionality of the present disclosure.

According to an exemplary embodiment, for each day, if the new estimated vehicle start time is neither earlier than then the predicted vehicle start time for that day in the weekly usage model nor later than the predicted vehicle start time for that day in the weekly usage model for the predetermined number of times, the weekly usage model for that day remains unchanged.

Figure 2:
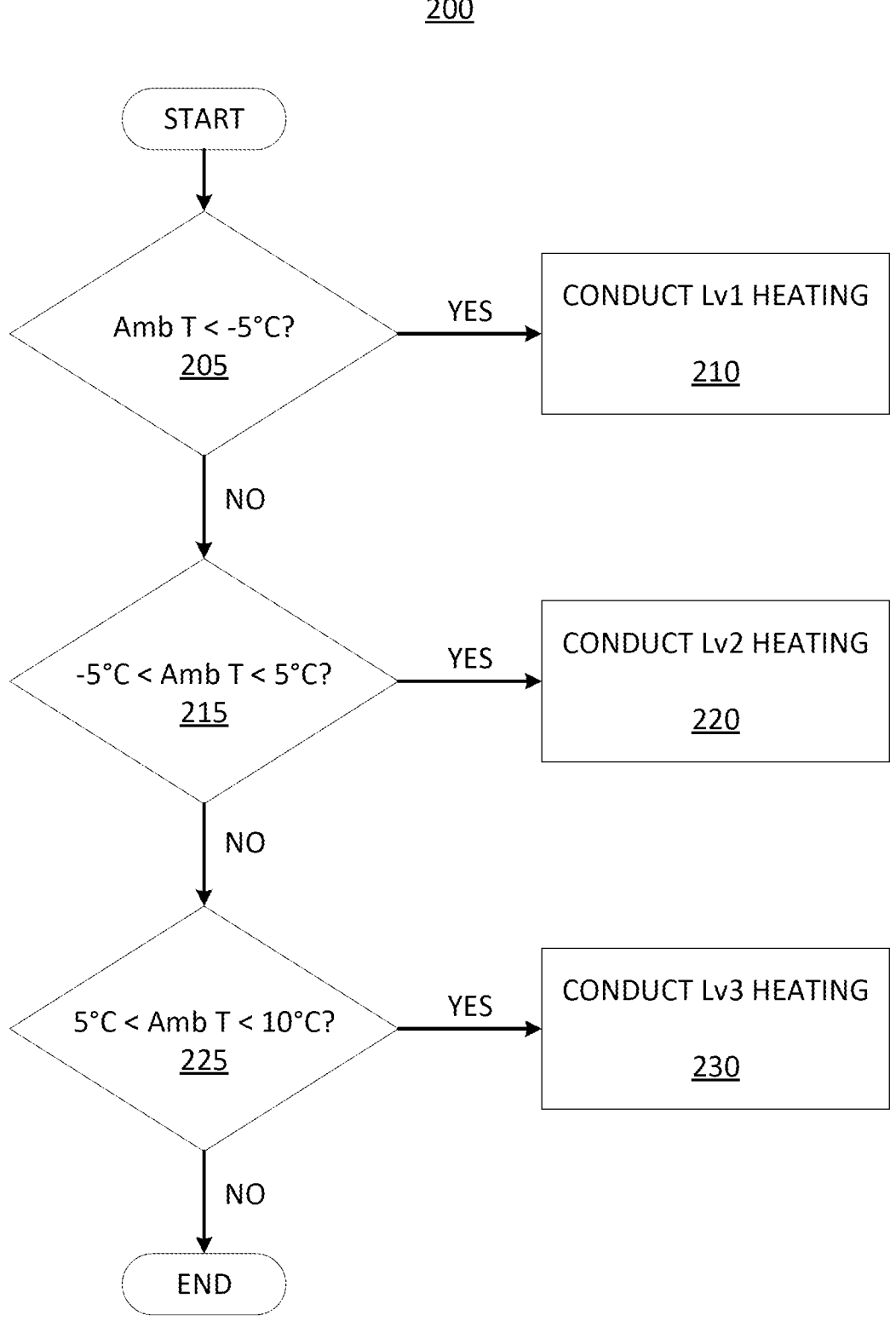
FIG. 2 illustrates a method of multi-level battery heating, according to an exemplary embodiment of the present disclosure.

Referring now to FIG. 2, a method 200 for multi-level battery heating is illustratively depicted, in accordance with an exemplary embodiment of the present disclosure.

According to an exemplary embodiment of the present disclosure, battery heating may occur in three separate levels: level 1 (Lv1); level 2 (Lv2); and level 3 (Lv3).

At 205, it is determined whether the ambient temperature of the battery is less than −5° C. When the ambient temperature of the battery is less than −5° C., then, at 210, level 1 heating is conducted.

When the ambient temperature of the battery is not less than −5° C., then, at 215, it is determined whether the ambient temperature of the battery is between −5° C. and 5° C. When the ambient temperature of the battery is between −5° C. and 5° C., then, at 220, level 2 heating is conducted.

When the ambient temperature of the battery is not between −5° C. and 5° C., then, at 225, it is determined whether the ambient temperature of the battery is between 5° C. and 10° C. When the ambient temperature of the battery is between 5° C. and 10° C., then, at 230, level 3 heating is conducted.

According to an exemplary embodiment, is the ambient temperature of the battery is greater than 10° C., no battery heating may be required.

Figure 3:
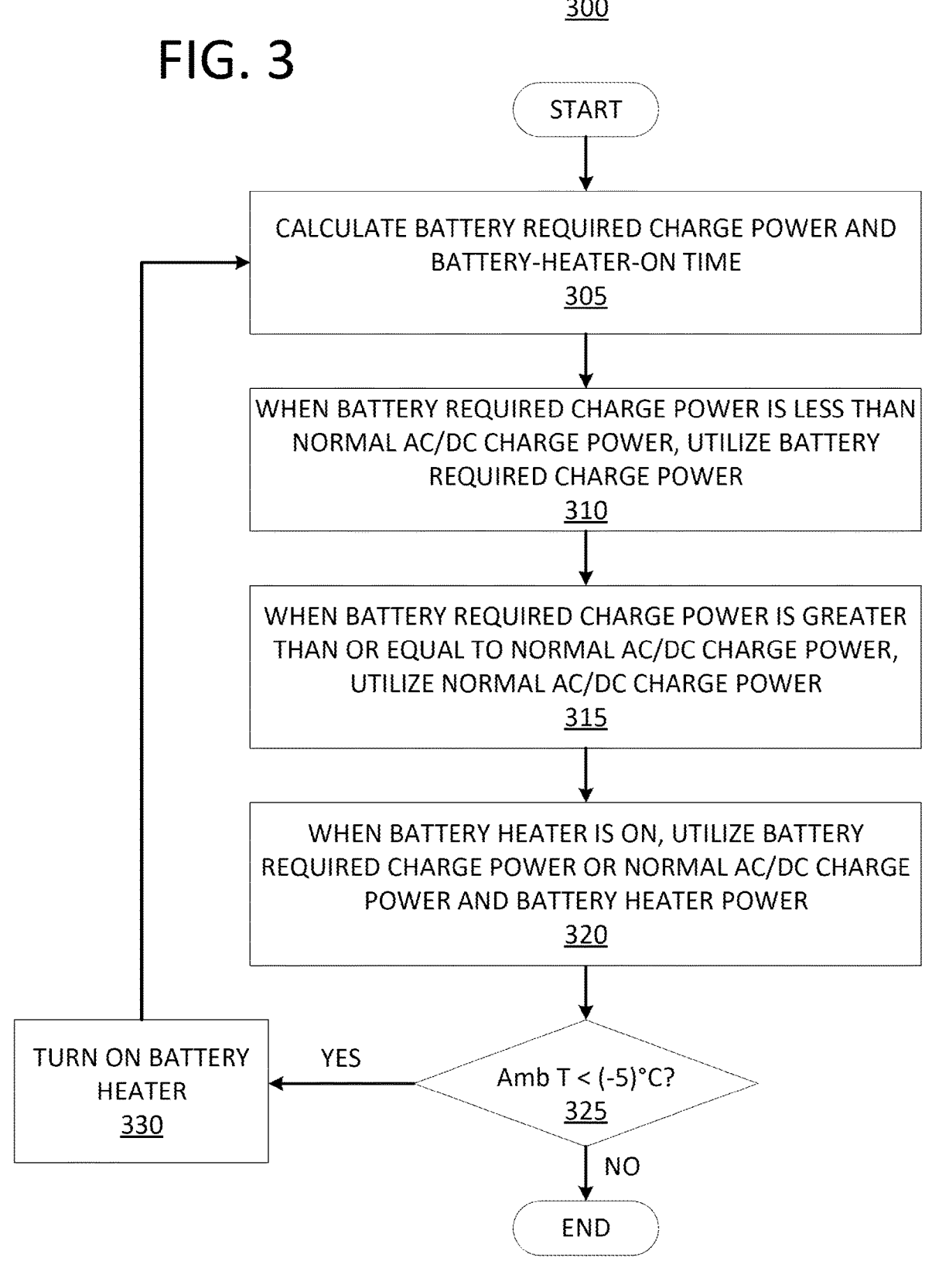
FIG. 3 illustrates a method of level 1 heating, according to an exemplary embodiment of the present disclosure.

Referring now to FIG. 3, a method 300 for performing level 1 heating is illustratively depicted, in accordance with an exemplary embodiment of the present disclosure.

According to an exemplary embodiment, during level 1 heating, the battery may be heated, to a minimum target temperature of approximately −5° C.

According to an exemplary embodiment, the level 1 heating may be configured to turn off once the ambient temperature of the battery reaches the level 1 heating target temperature (e.g., −5° C.).

At 305, a battery required charge power and batter-heater-on time may be calculated.

According to an exemplary embodiment, for each day, level 1 heating may occur for a battery-heater-on time. The battery-heater-on time for level 1 heating may be from approximately immediately upon charging the battery until the time reaches approximately 70% of the estimated vehicle start time of the weekly usage model and/or the new estimated vehicle start time. According to an exemplary embodiment, level 1 heating requires low heating energy for batteries and level 1 heating may be configured to be maintained as long as possible until 70% of the estimated vehicle start time of the weekly usage model and/or the new estimated vehicle start time.

According to an exemplary embodiment, the battery required charge power for level 1 heating may be calculated according to Equation 1.

$$\text{Battery Required Charge Power} = \frac{(\text{Target } SOC_{final} - \text{Current } SOC)/100 \cdot (\text{BatteryPackSize\_kWh})}{[(\text{Estimated Vehicle Start TIme})\cdot \lambda - \text{Current Time}]}$$

Equation 1

Where Target $SOC_{final}$ is the final target state of charge (SOC) of the battery, Current SOC is the current SOC of the battery, BatteryPackSize_kWh is the capacity of the battery pack (in kWh), Estimated Vehicle Start TIme is the esti-mated vehicle start time of the weekly usage model and/or the new estimated vehicle start time, $\lambda$ is 0.7 (or 70%), and Current Time is the current time. According to an exemplary embodiment, the estimated vehicle start time is measured in minutes from midnight on the date in question. According to various embodiments, the current time is measured in min-utes from the estimated vehicle start time.

According to an exemplary embodiment, it may be deter-mined whether the battery required charge power is less than a normal AC/DC charge power. At 310, when the battery required charge power is less than the normal AC/DC charge power, the battery required charge power is utilized to heat the battery.

According to an exemplary embodiment, it may be deter-mined whether the battery required charge power is greater than or equal to the normal AC/DC charge power. At 315, when the battery required charge power is greater than or equal to the normal AC/DC charge power, the normal AC/DC charge power may be utilized to heat the battery.

According to an exemplary embodiment, it may be deter-mined whether a battery heater is turned on. The battery heater may run on battery heater power. At 320, when the battery heater is turned on, the battery required charge power or the normal AC/DC charge power, in addition to the battery heater power, may be utilized to heat the battery.

According to an exemplary embodiment, at 325, it is determined whether the ambient temperature of the battery is less than −5° C. When the ambient temperature of the battery is less than −5° C., then, at 330, the battery heater is turned on and the battery required charge power is calcu-lated, at 305. When the ambient temperature of the battery is not less than −5° C., then the level 1 heating turns off.

Figure 4:
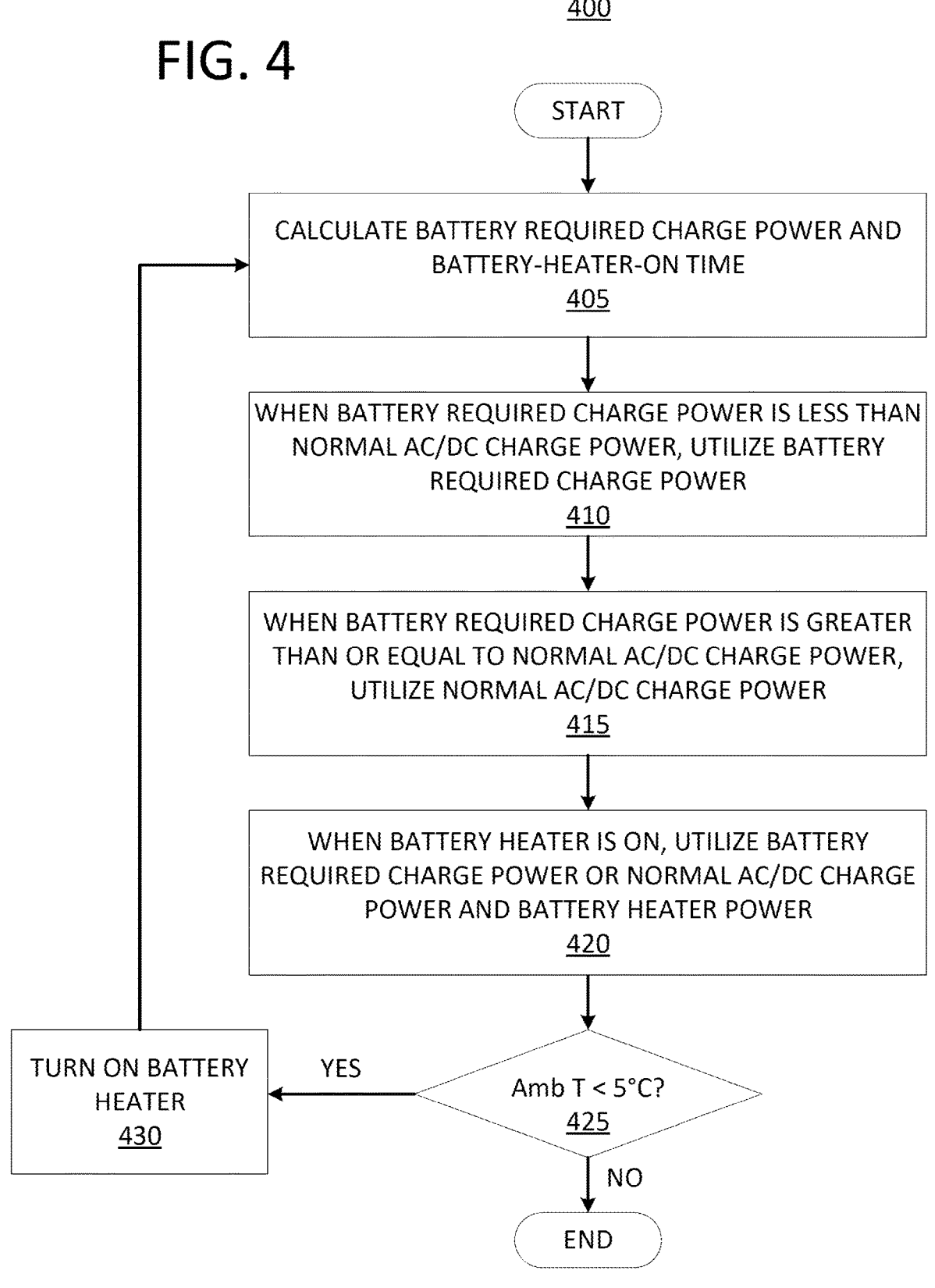
FIG. 4 illustrates a method of level 2 heating, according to an exemplary embodiment of the present disclosure.

Referring now to FIG. 4, a method 400 for performing level 2 heating is illustratively depicted, in accordance with an exemplary embodiment of the present disclosure.

According to an exemplary embodiment, during level 2 heating, the battery may be heated, to a minimum target temperature of approximately 5° C.

According to an exemplary embodiment, the level 2 heating may be configured to turn off once the ambient temperature of the battery reaches the level 2 heating target temperature (e.g., 5° C.).

At 405, a battery required charge power and batter-heater-on time may be calculated.

According to an exemplary embodiment, for each day, level 1 heating may occur for a battery-heater-on time. According to an embodiment, the battery may be heated using level 2 heating until the time reaches approximately 80% of the estimated vehicle start time of the weekly usage model and/or the new estimated vehicle start time. The battery-heater-on time for level 2 heating may be determined according to Equation 2.

$$\text{Battery-Heater-On Time} = (\text{Estimated Vehicle Start TIme})\cdot \alpha - \frac{(\text{Temp}_{\text{Target\_Lv2}} - \text{Temp}_{Target\_Lv1})\cdot \text{Specific Heat}_{Battery}}{\text{Battery Heater Power}}$$

Equation 2

Where Estimated Vehicle Start TIme is the estimated vehicle start time of the weekly usage model and/or the new estimated vehicle start time, a is 0.8 (or 80%), $\text{Temp}_{Target\_Lv2}$ is the target temperature for level 2 heating, $\text{Temp}_{Target\_Lv1}$ is the target temperature for level 1 heating, Specific Heat-$_{Battery}$ is the specific heat of the battery, and Battery Heater Power is the battery heater power. According to an exem-plary embodiment, the estimated vehicle start time is mea-sured in minutes from midnight on the date in question. According to various embodiments, the current time is measured in minutes from the estimated vehicle start time.

According to an exemplary embodiment, the battery required charge power for level 2 heating may be calculated according to Equation 3.

$$\text{Battery Required Charge Power} = \frac{(\text{Target } SOC_{final} - \text{Current } SOC)/100 \cdot (\text{BatteryPackSize\_kWh})}{[(\text{Estimated Vehicle Start TIme})\cdot \alpha - \text{Current Time}]}$$

Equation 3

Where Target $SOC_{final}$ is the final target state of charge (SOC) of the battery, Current SOC is the current SOC of the battery, BatteryPackSize_kWh is the capacity of the battery pack (in kWh), Estimated Vehicle Start TIme is the estimated vehicle start time of the weekly usage model and/or the new estimated vehicle start time, a is 0.8 (or 80%), and Current Time is the current time. According to an exemplary embodiment, the estimated vehicle start time is measured in minutes from midnight on the date in question. According to various embodiments, the current time is measured in minutes from the estimated vehicle start time.

According to an exemplary embodiment, it may be determined whether the battery required charge power is less than a normal AC/DC charge power. At 410, when the battery required charge power is less than the normal AC/DC charge power, the battery required charge power is utilized to heat the battery.

According to an exemplary embodiment, it may be determined whether the battery required charge power is greater than or equal to the normal AC/DC charge power. At 415, when the battery required charge power is greater than or equal to the normal AC/DC charge power, the normal AC/DC charge power may be utilized to heat the battery.

According to an exemplary embodiment, it may be determined whether a battery heater is turned on. The battery heater may run on battery heater power. At 420, when the battery heater is turned on, the battery required charge power or the normal AC/DC charge power, in addition to the battery heater power, may be utilized to heat the battery.

According to an exemplary embodiment, at 425, it is determined whether the ambient temperature of the battery is less than 5° C. When the ambient temperature of the battery is less than 5° C., then, at 430, the battery heater is turned on and the battery required charge power is calculated, at 405. When the ambient temperature of the battery is not less than 5° C., then the level 2 heating turns off.

Figure 5:
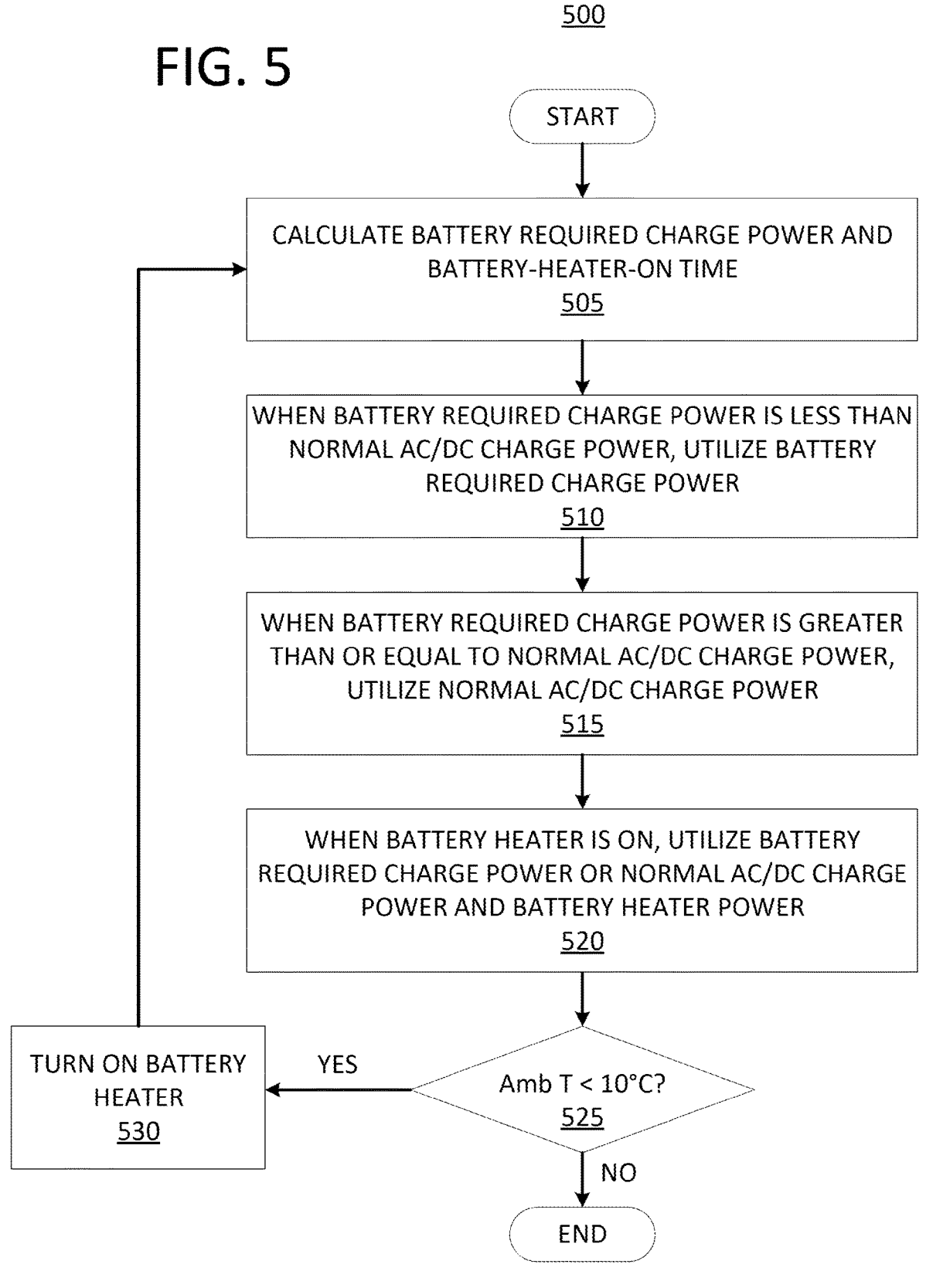
FIG. 5 illustrates a method of level 3 heating, according to an exemplary embodiment of the present disclosure.

Referring now to FIG. 5, a method 500 for performing level 3 heating is illustratively depicted, in accordance with an exemplary embodiment of the present disclosure.

According to an exemplary embodiment, during level 3 heating, the battery may be heated, to a minimum target temperature of approximately 10° C.

According to an exemplary embodiment, the level 3 heating may be configured to turn off once the ambient temperature of the battery reaches the level 3 heating target temperature (e.g., 10° C.).

At 505, a battery required charge power and batter-heater-on time may be calculated.

According to an exemplary embodiment, for each day, level 3 heating may occur for a battery-heater-on time. According to an embodiment, the battery may be heated using level 3 heating until the time reaches approximately 90% of the estimated vehicle start time of the weekly usage model and/or the new estimated vehicle start time. The battery-heater-on time for level 3 heating may be determined according to Equation 4.

$$\begin{aligned} &\text{Battery-Heater-} \\ &\quad \text{On Time} = (\text{Estimated Vehicle Start TIme}) \cdot \beta - \\ &\qquad \frac{\left(\text{Temp}_{Target\_Lv3} - \text{Temp}_{Target\_Lv1}\right) \cdot \text{Specific Heat}_{Battery}}{\text{Battery Heater Power}} \end{aligned}$$

<div align="right">Equation 4</div>

Where Estimated Vehicle Start TIme is the estimated vehicle start time of the weekly usage model and/or the new estimated vehicle start time, β is 0.9 (or 90%), $\text{Temp}_{Target\_Lv3}$ is the target temperature for level 3 heating, $\text{Temp}_{Tar-}$ $_{get\_Lv2}$ is the target temperature for level 2 heating, Specific $\text{Heat}_{Battery}$ is the specific heat of the battery, and Battery Heater Power is the battery heater power. According to an exemplary embodiment, the estimated vehicle start time is measured in minutes from midnight on the date in question. According to various embodiments, the current time is measured in minutes from the estimated vehicle start time.

According to an exemplary embodiment, the battery required charge power for level 3 heating may be calculated according to Equation 5.

<div align="right">Equation 5</div>

$$\text{Battery Required Charge Power} = \frac{\dfrac{(\text{Target } SOC_{final} - \text{Current } SOC)}{/100 \cdot (\text{BatteryPackSize\_kWh})}}{[(\text{Estimated Vehicle Start TIme}) \cdot \beta - \text{Current Time}]}$$

Where Target $SOC_{final}$ is the final target state of charge (SOC) of the battery, Current SOC is the current SOC of the battery, BatteryPackSize_kWh is the capacity of the battery pack (in kWh), Estimated Vehicle Start TIme is the estimated vehicle start time of the weekly usage model and/or the new estimated vehicle start time, β is 0.9 (or 90%), and Current Time is the current time. According to an exemplary embodiment, the estimated vehicle start time is measured in minutes from midnight on the date in question. According to various embodiments, the current time is measured in minutes from the estimated vehicle start time.

According to an exemplary embodiment, it may be determined whether the battery required charge power is less than a normal AC/DC charge power. At 510, when the battery required charge power is less than the normal AC/DC charge power, the battery required charge power is utilized to heat the battery.

According to an exemplary embodiment, it may be determined whether the battery required charge power is greater than or equal to the normal AC/DC charge power. At 515, when the battery required charge power is greater than or equal to the normal AC/DC charge power, the normal AC/DC charge power may be utilized to heat the battery.

According to an exemplary embodiment, it may be determined whether a battery heater is turned on. The battery heater may run on battery heater power. At 520, when the battery heater is turned on, the battery required charge power or the normal AC/DC charge power, in addition to the battery heater power, may be utilized to heat the battery.

According to an exemplary embodiment, at 525, it is determined whether the ambient temperature of the battery is less than 10° C. When the ambient temperature of the battery is less than 10° C., then, at 530, the battery heater is turned on and the battery required charge power is calculated, at 505. When the ambient temperature of the battery is not less than 10° C., then the level 3 heating turns off.

Figure 6:
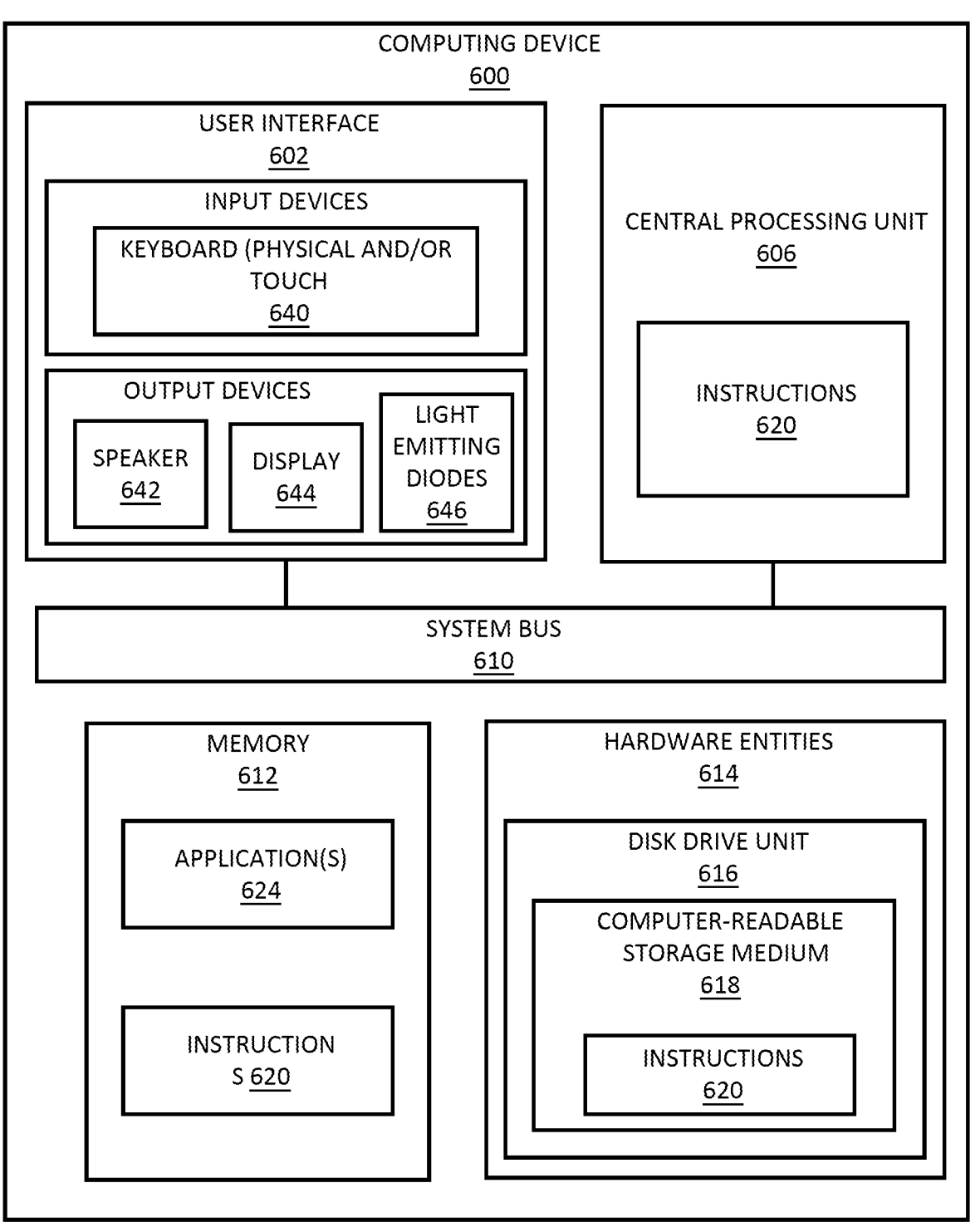
FIG. 6 illustrates example elements of a computing device, according to an exemplary embodiment of the present disclosure.

Referring now to FIG. 6, an illustration of an example architecture for a computing device 600 is provided. According to an exemplary embodiment, one or more functions of the systems of the present disclosure may be implemented by a computing device such as, e.g., computing device 600 or a computing device similar to computing device 600.

The hardware architecture of FIG. 6 represents one example implementation of a representative computing device configured to one or more methods and means for preheating a battery heater of an EV, as described herein. As such, the computing device 600 of FIG. 6 implements at least a portion of the method(s) (e.g., method 100, method 200, method 300, method 400, and method 500) described herein.

Some or all components of the computing device 600 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 6, the computing device 600 may comprise a user interface 602, a Central Processing Unit ("CPU") 606, a system bus 610, a memory 612 connected to and accessible by other portions of computing device 600 through system bus 610, and hardware entities 614 connected to system bus 610. The user interface may comprise input devices and output devices, which may be configured to facilitate user-software interactions for controlling operations of the computing device 600. The input devices may comprise, but are not limited to, a physical and/or touch keyboard 650. The input devices may be connected to the computing device 600 via a wired or wireless connection (e.g., a Bluetooth® connection). The output devices may comprise, but are not limited to, a speaker 652, a display 654, and/or light emitting diodes 656.

At least some of the hardware entities 614 may be configured to perform actions involving access to and use of memory 612, which may be a Random Access Memory (RAM), a disk driver and/or a Compact Disc Read Only Memory (CD-ROM), among other suitable memory types. Hardware entities 614 may comprise a disk drive unit 616 comprising a computer-readable storage medium 618 on which may be stored one or more sets of instructions 620 (e.g., programming instructions such as, but not limited to, software code) configured to implement one or more of the methodologies, procedures, or functions described herein. The instructions 620 may also reside, completely or at least partially, within the memory 612 and/or within the CPU 606 during execution thereof by the computing device 600.

The memory 612 and the CPU 606 may also constitute machine-readable media. The term "machine-readable media", as used here, refers to a single medium or multiple media (e.g., a centralized or distributed database, and/or associated caches and servers) that store the one or more sets of instructions 620. The term "machine-readable media", as used here, also refers to any medium that is capable of storing, encoding or carrying a set of instructions 620 for execution by the computing device 600 and that cause the computing device 600 to perform any one or more of the methodologies of the present disclosure.

Figure 7:
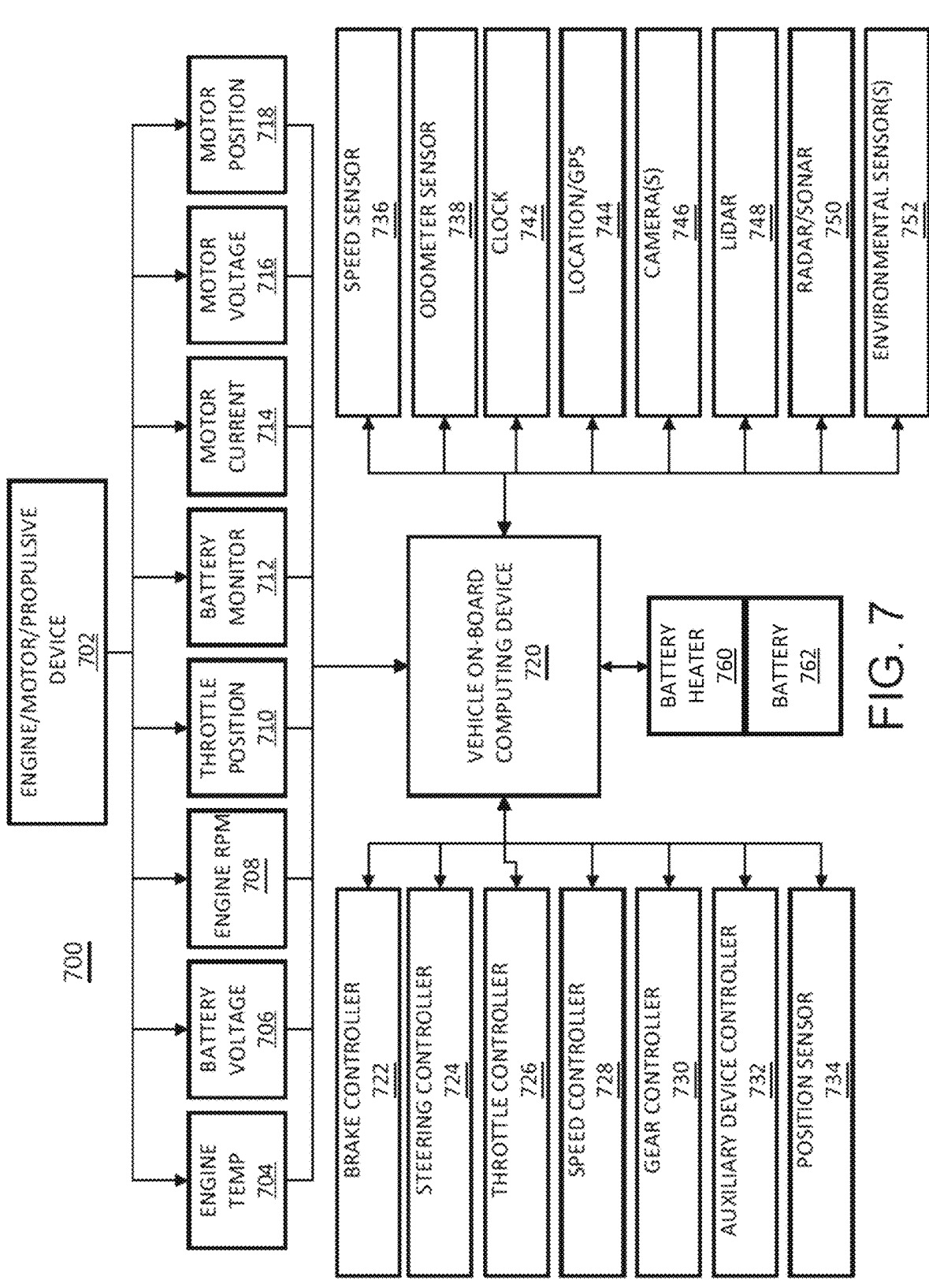
FIG. 7 illustrates an example architecture of a vehicle, according to an exemplary embodiment of the present disclosure.

Referring now to FIG. 7, an example vehicle system architecture 700 for a vehicle (e.g., an EV, as described above) is provided, in accordance with an exemplary embodiment of the present disclosure.

As shown in FIG. 7, the vehicle system architecture 700 may comprise an engine, motor or propulsive device (e.g., a thruster) 702 and various sensors 704-718 for measuring various parameters of the vehicle system architecture 700. In gas-powered or hybrid vehicles having a fuel-powered engine, the sensors 704-718 may comprise, for example, an engine temperature sensor 704, a battery voltage sensor 706, an engine Rotations Per Minute (RPM) sensor 708, and/or a throttle position sensor 710. If the vehicle is an electric or hybrid vehicle, then the vehicle may comprise an electric motor, and accordingly may comprise sensors such as a battery monitoring system 712 (to measure current, voltage and/or temperature of the battery), motor current 714 and voltage 716 sensors, and motor position sensors such as resolvers and encoders 718.

Operational parameter sensors that are common to both types of vehicles may comprise, for example: a position sensor 734 such as an accelerometer, gyroscope and/or inertial measurement unit; a speed sensor 736: and/or an odometer sensor 738. The vehicle system architecture 700 also may comprise a clock 742 that the system uses to determine vehicle time during operation. The clock 742 may be encoded into the vehicle on-board computing device 720, it may be a separate device, or multiple clocks may be available.

The vehicle system architecture 700 may further include the battery heater (represented as battery heater 760) and the battery (represented as battery 762). The battery heater 760 is provided in electrical communication with a processor (e.g., the vehicle on-board computing device 720) and in thermal communication with the battery 762 to perform the heating function(s) discussed herein.

The vehicle system architecture 700 also may comprise various sensors that operate to gather information about the environment in which the vehicle is traveling. These sensors may comprise, for example: a location sensor 744 (for example, a Global Positioning System (GPS) device); object detection sensors such as one or more cameras 746; a LiDAR sensor system 748; and/or a RADAR and/or a sonar system 750. The sensors also may comprise environmental sensors 752 such as, e.g., a humidity sensor, a precipitation sensor, and/or ambient temperature sensor. The object detection sensors may be configured to enable the vehicle system architecture 700 to detect objects that are within a given distance range of the vehicle in any direction, while the environmental sensors 752 may be configured to collect data about environmental conditions within the vehicle's area of travel.

During operations, information may be communicated from the sensors to an on-board computing device 720 (e.g., computing device 600 of FIG. 6). The on-board computing device 720 may be configured to analyze the data captured by the sensors and/or data received from data providers and may be configured to optionally control operations of the vehicle system architecture 700 based on results of the analysis. For example, the on-board computing device 720 may be configured to control: braking via a brake controller 722; direction via a steering controller 724; speed and acceleration via a throttle controller 726 (in a gas-powered vehicle) or a motor speed controller 728 (such as a current level controller in an electric vehicle); a differential gear controller 730 (in vehicles with transmissions); and/or other controllers.

Geographic location information may be communicated from the location sensor 744 to the on-board computing device 720, which may then access a map of the environment that corresponds to the location information to determine known fixed features of the environment such as streets, buildings, stop signs and/or stop/go signals. Captured images from the cameras 746 and/or object detection information captured from sensors such as LiDAR 748 may be communicated from those sensors to the on-board computing device 720. The object detection information and/or captured images may be processed by the on-board computing device 720 to detect objects in proximity to the vehicle. Any known or to be known technique for making an object detection based on sensor data and/or captured images may be used in the embodiments disclosed in this document.

The above description is merely illustrative of the technical spirit of the present disclosure, and those skilled in the art to which the present disclosure belongs may make various modifications and changes without departing from the essential features of the present disclosure.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A method for preheating a battery of an electric vehicle (EV), comprising:

measuring, by a temperature sensor, an ambient temperature of a battery of the EV:

determining, by a processor, an estimated vehicle start time for an EV;

determining, by the processor, whether the ambient temperature of the battery of the EV is less than −5° C.;

when the ambient temperature of the battery is less than −5° C., controlling, by the processor, a battery heater to perform a level 1 heating function to heat the battery;

when the ambient temperature of the battery is not less than −5° C., determining by the processor, whether the ambient temperature of the battery is between −5° C. and 5° C.;

when the ambient temperature of the battery is between −5° C. and 5° C., controlling by the processor, the battery heater to perform a level 2 heating function to heat the battery;

when the ambient temperature of the battery is not less than −5° C. and not between −5° C. and 5° C., then, determining, by the processor, whether the ambient temperature of the battery is between 5° C. and 10° C.; and when the ambient temperature of the battery is between 5° C. and 10° C., controlling, by the processor, the battery heater to perform a level 3 heating function to heat the battery.

2. The method of claim 1, wherein the determining the estimated vehicle start time for the EV comprises:

determining whether a vehicle charger was plugged in to the EV for at least a minimum threshold time duration prior to the EV being turned on;

determining whether the EV was parked for a minimum threshold time duration prior to being turned on;

determining whether a user drove the EV for a minimum threshold driving distance on a first driving event over a set timeframe; and when the vehicle charger was plugged in to the EV for the at least a minimum threshold time duration prior to the EV being turned on, the EV was parked for the minimum threshold time duration prior to being turned on, and the user drove the EV for the minimum threshold driving distance on the first driving event over the set timeframe, determining the estimated vehicle timeframe as a time at which the vehicle was first turned on over the set timeframe.

3. The method of claim 2, wherein the minimum threshold time duration that the vehicle charger was plugged in to the EV prior to the EV being turned on is one hour.

4. The method of claim 2, wherein the minimum threshold time duration that the EV was parked prior to the EV being turned on is eight hours.

5. The method of claim 2, wherein:

the minimum threshold driving distance is five miles; and the set timeframe is twenty-four hours.

6. The method according to claim 1, wherein the determining the estimated vehicle start time for the EV comprises updating the estimated vehicle start time.

7. The method according to claim 6, wherein the updating the estimated vehicle start time comprises:

when a new estimated vehicle start time is earlier than then the estimated vehicle start time, updating the estimated vehicle start time as the new estimated vehicle start time; and when the new estimated vehicle start time is later than the estimated vehicle start time for a predetermined number of times, updating the estimated vehicle start time as the new estimated vehicle start time.

8. The method according to claim 7, wherein the predetermined number of times is two.

9. The method of claim 1, wherein the performing the level 1 heating function comprises:

determining whether the ambient temperature of the battery is greater than −5° C.; and when the ambient temperature of the battery is greater than −5° C., controlling, by the processor, the battery heater to turning off the level 1 heating function.

10. The method of claim 1, wherein the performing the level 1 heating function comprises:

calculating a battery required charge power; and calculating a battery-heater-on time for the battery heater during the level 1 function.

11. The method of claim 10, wherein the performing the level 1 heating function comprises:

when the battery required charge power is less than an AC/DC charge power, utilizing the battery required charge power to heat the battery;

when the battery required charge power is greater than or equal to the AC/DC charge power, utilizing the AC/DC charge power to heat the battery; and when the battery heater is turned on, utilizing, to heat the battery:

the battery required charge power or the AC/DC charge power; and battery heater power.

12. The method of claim 10, wherein the performing the level 1 heating function comprises:

when the ambient temperature of the battery is less than −5° C., controlling by the processor the battery heater to turn on.

13. The method of claim 1, wherein the performing the level 2 heating function comprises:

determining whether the ambient temperature of the battery is greater than 5° C.; and when the ambient temperature of the battery is greater than 5° C., controlling by the processor, the battery heater to turn off the level 2 heating function.

14. The method of claim 1, wherein the performing the level 2 heating function comprises:

calculating a battery required charge power; and calculating a battery-heater-on time for a the battery heater during the level 2 function.

15. The method of claim 14, wherein the performing the level 2 heating function comprises:

when the battery required charge power is less than an AC/DC charge power, utilizing the battery required charge power to heat the battery;

when the battery required charge power is greater than or equal to the AC/DC charge power, utilizing the AC/DC charge power to heat the battery; and when the battery heater is turned on, utilizing, to heat the battery:

the battery required charge power or the AC/DC charge power; and battery heater power.

16. The method of claim 14, wherein the performing the level 2 heating function comprises:

when the ambient temperature of the battery is less than 5° C., controlling, by the processor, the battery heater to turn on.

17. The method of claim 1, wherein the performing the level 3 heating function comprises:

determining whether the ambient temperature of the battery is greater than 10° C.; and controlling, by the processor, the battery heater when the ambient temperature of the battery is greater than 10° C., to turn off to stop the level 3 heating function.

18. The method of claim 1, wherein the performing the level 3 heating function comprises:

calculating a battery required charge power; and calculating a battery-heater-on time for a the battery heater during the level 3 function.

19. The method of claim 18, wherein the performing the level 3 heating function comprises:

when the battery required charge power is less than an AC/DC charge power, utilizing the battery required charge power to heat the battery;

when the battery required charge power is greater than or equal to the AC/DC charge power, utilizing the AC/DC charge power to heat the battery; and when the battery heater is turned on, utilizing, to heat the battery:

the battery required charge power or the AC/DC charge power; and battery heater power.

20. The method of claim 18, wherein the performing the level 3 heating function comprises:

when the ambient temperature of the battery is less than 10° C., controlling, by the processor, the battery heater to turn on.

* * * * *